United States Patent
Hanks et al.

(10) Patent No.: US 9,738,011 B2
(45) Date of Patent: Aug. 22, 2017

(54) CONCURRENT INFUSION OF DISSIMILAR RESINS

(71) Applicant: The Boeing Company, Chicago, IL (US)

(72) Inventors: Dennis James Hanks, Enumclaw, WA (US); Hugh A. Yap, Phoenix, AZ (US)

(73) Assignee: THE BOEING COMPANY, Chicago, IL (US)

( * ) Notice: Subject to any disclaimer, the term of this patent is extended or adjusted under 35 U.S.C. 154(b) by 514 days.

(21) Appl. No.: 14/282,199

(22) Filed: May 20, 2014

(65) Prior Publication Data

US 2015/0336294 A1 Nov. 26, 2015

(51) Int. Cl.
*B29B 11/16* (2006.01)
*B29C 70/44* (2006.01)
*B29C 70/54* (2006.01)

(52) U.S. Cl.
CPC ............ *B29B 11/16* (2013.01); *B29C 70/443* (2013.01); *B29C 70/548* (2013.01); *Y10T 156/10* (2015.01); *Y10T 156/16* (2015.01)

(58) Field of Classification Search
CPC .............................. B29C 70/443; B29B 11/16
See application file for complete search history.

(56) References Cited

U.S. PATENT DOCUMENTS

| 6,048,488 A * | 4/2000 | Fink ...................... B29C 70/08 264/102 |
| 7,334,782 B2 | 2/2008 | Woods et al. |
| 7,727,631 B2 | 6/2010 | Fang et al. |
| 2002/0022422 A1* | 2/2002 | Waldrop, III ......... B29C 70/443 442/179 |
| 2007/0057413 A1 | 3/2007 | Haney |
| 2008/0079193 A1* | 4/2008 | Hanks ................... B29C 70/548 264/257 |
| 2008/0305340 A1* | 12/2008 | Fang ..................... B29C 70/443 428/411.1 |

FOREIGN PATENT DOCUMENTS

EP    2620265 A1    7/2013

OTHER PUBLICATIONS http://onlinelibrary.wiley.com/doi/10.1002/pc.10401/epdf, Gillio et al., "Processing and Properties of Co-Injected Resin Transfer Molded Vinyl Ester and Phenolic Composites", Polymer Composites, Dec. 1999, vol. 20, No. 6, p. 781-782.*
Extended European Search Report, dated Oct. 20, 2015, regarding Application No. EP15168125.1, 8 pages.

* cited by examiner

*Primary Examiner* — Jeff Aftergut
*Assistant Examiner* — Jaeyun Lee
(74) *Attorney, Agent, or Firm* — Yee & Associates, P.C.

(57) ABSTRACT

A fiber preform is infused with two differing resin systems concurrently using stacked resin delivery assemblies located along one edge of the preform.

19 Claims, 7 Drawing Sheets

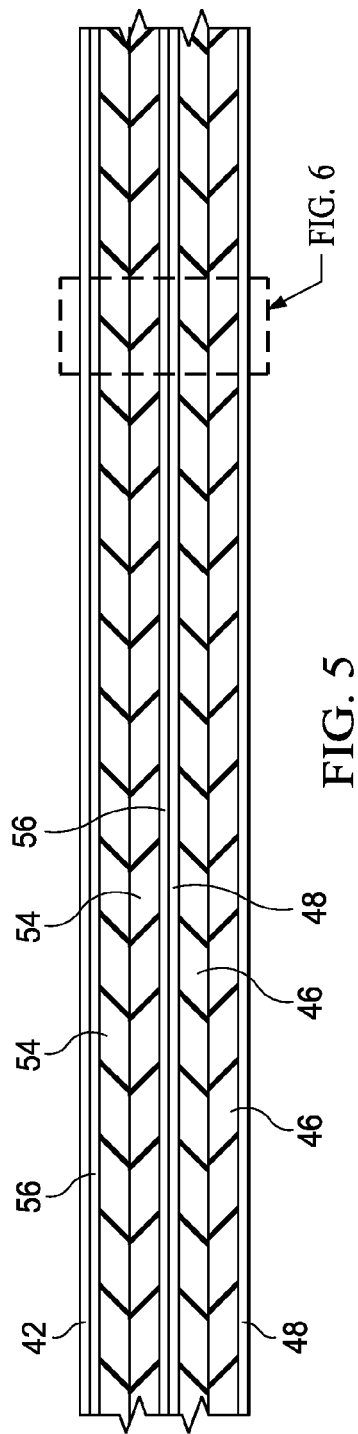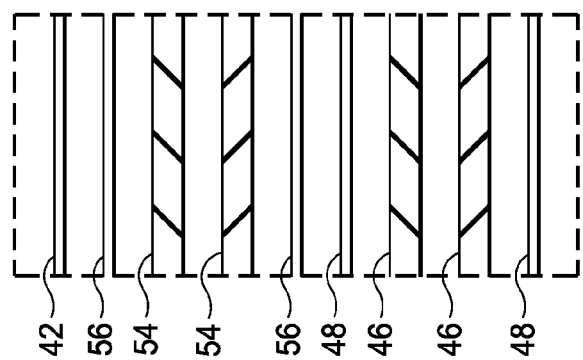

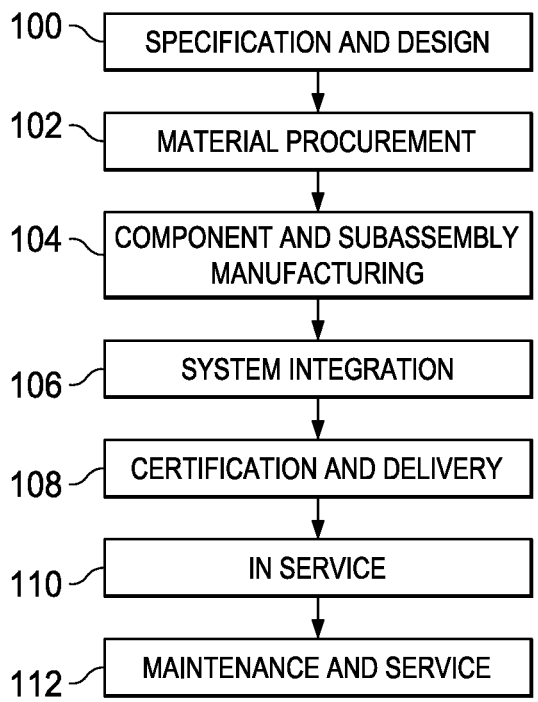
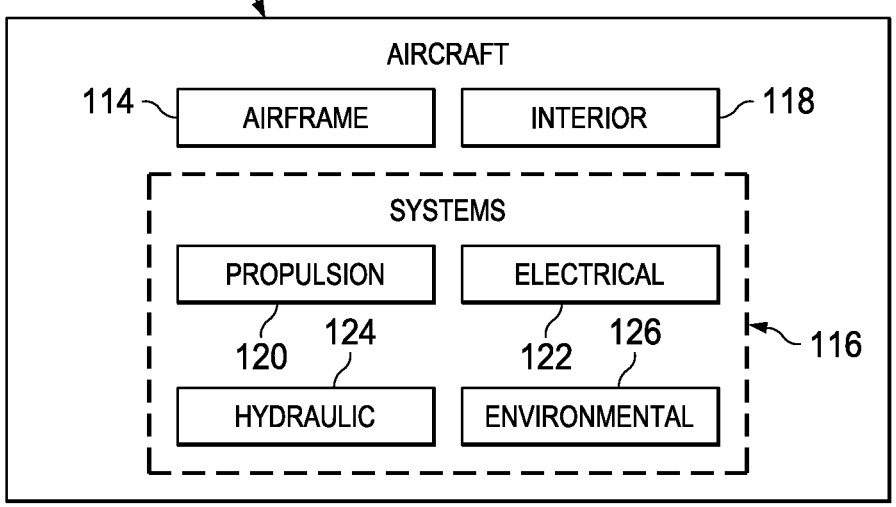

CONCURRENT INFUSION OF DISSIMILAR RESINS

BACKGROUND INFORMATION

1. Field

The present disclosure generally relates to composite parts made by resin infusion of fiber preforms, and deals more particularly with a method and apparatus for infusing a fiber preform with at least two dissimilar resins.

2. Background

Conventional resin infused parts are generally produced by infusing a dry fiber preform with a either a liquid resin or a solid resin whose viscosity will drop significantly once heated. In all cases, the movement of the resin is from one side of the preform to the other. The resulting part has a substantially even distribution of a single resin and exhibits consistent physical properties and appearance throughout. In some applications though, it may be necessary to provide the part with two different resin systems for appearance or for a functional purpose such as anti-abrasion, anti-reflection or impact resistance, to name only a few.

In some applications, the desired surface treatment may be achieved by placing a separate, nonstructural coating in a resin infusion tool before the preform is resin infused. This is typically known as a gel coat and is standard practice in the art of resin infusion. But in more traditional applications, a coating may be applied to the surface of the part after the part has been fabricated. In either event, the surface treatment requires a separate processing step which may be time-consuming and/or labor intensive. Known surface treatments, regardless of the techniques used, generally result in a surface layer that is separate and distinct from the underlying resin part. Besides being generally different in chemistries from the substrate, the surface layer may increase the tendency to delaminate, chip or separate from the laminate, and could result in environmental degradation that may have an undesirable effect on part performance over time.

Accordingly, there is a need for a method and apparatus for producing a monolithic, resin infused parts having an integral surface layer that is similar to and compatible with the base resin system. There is also a need for a method and apparatus of the type described above that permits fabrication of resin infused parts with blended regions of at least two differing resins.

SUMMARY

The disclosed embodiments provide a method and apparatus for producing composite parts using resin infusion of a fiber preform with at least two differing resins. One or more surface treatments may be achieved in a single infusion that are smoothly blended and integrated with the part. Resin infused parts may be produced using two differing resins in a single process, thereby reducing time and labor required to achieve separate surface treatments. Weight reduction of resin infused parts may be realized through the elimination of heavy additives such as fire retardants or metallic fillers which previously were required to be distributed throughout the entire thickness of the part. The mechanical performance and appearance of resin infused parts may also be improved using the disclosed method and apparatus.

According to one disclosed embodiment, apparatus is provided for infusing a fiber preform with at least two differing resins. A first resin delivery assembly is provided that is capable of delivering a first resin to a first location on the preform, including a first flow media. The apparatus also includes a second resin delivery assembly capable of supplying a second resin to a second location on the preform, including a second flow media overlapping the first flow media. Each of the first and second flow media is sandwiched between barrier films. The barrier films overlap an edge of the fiber preform. At least one of the barrier films separates the two flow media to prevent mixing of the two resins before they are infused into the preform. A barrier is provided along an edge of the preform to maintain separation between the two flow media. The first flow media is located on the top side of the fiber preform, and the second flow media is located on the bottom side of the fiber preform. The media functions to provide pathways that facilitate flow of the resin across the preform. The first resin delivery assembly includes a first resin delivery tube extending along an edge of the fiber preform and coupled with the first flow media, and the second resin delivery assembly includes a second resin delivery tube extending along the edge of the fiber preform and coupled with the second flow media. The first and second resin delivery tubes are arranged side-by-side, and the first and second flow media respectively infuse the fiber preform with the first and second resins through the thickness of the preform. The first flow media is wrapped around the first resin delivery tube, and the second flow media is wrapped around the second resin delivery tube. The second resin delivery tube overlies the second flow media. The first resin delivery assembly includes an outer first tube surrounding the first resin delivery tube. The outer first tube has a longitudinal first slit therein and the first flow media passes through the longitudinal first slit. The second resin delivery assembly includes an outer second tube surrounding the second resin delivery tube. The outer second tube has a longitudinal second slit therein and the second flow media passes through the longitudinal second slit.

According to another disclosed embodiment, apparatus is provided for concurrently infusing a fiber preform with first and second differing resins. The apparatus includes a first resin delivery tube located along an edge of the preform and capable of delivering a first resin to the fiber preform. A second resin delivery tube is located along the edge of the preform and is capable of delivering a second resin to the fiber preform, wherein the second resin is different from the first resin. First and second overlapping flow media are provided which are respectively coupled between the first and second resin delivery tubes and the fiber preform. The first and second resin delivery tubes are disposed side-by-side and are laterally spaced from the edge of the preform. The apparatus further comprises at least one barrier film between the first and second overlapping flow media. The apparatus may also comprise first barrier films between which the first flow media is sandwiched, and second barrier films between which the second flow media is sandwiched. The apparatus may also include a first outer tube surrounding the first resin delivery tube and having a longitudinal first slit therein, wherein the first flow media is located between the first delivery tube and the first outer tube, and the first flow media extends through the longitudinal first slit in the first outer tube. A second outer tube surrounds the second resin delivery tube and has a longitudinal second slit therein. The second flow media is located between the second resin delivery tube, and the second outer tube and the second flow media extends through the longitudinal second in the second outer tube. Each of the first and second resin delivery tubes includes a spiral opening allowing resin to flow therethrough.

According to a further disclosed embodiment, a method is provided of infusing a fiber preform with at least two differing resins. First and second resin delivery tubes are placed side-by-side along one edge of a fiber preform. First and second resin flow media respectively coupled between the first and second resin delivery tubes and the preform. The first and second resin flow media are overlapped. A first resin through the first resin delivery tube and the first resin flow media to the preform. A second resin is delivered through the second resin delivery tube and the second resin flow media to the preform. The method may further comprise placing a barrier film between an area of overlap between the first and second resin flow media. Delivering the first resin includes flowing the first resin horizontally over a top of the fiber preform, and delivering the second resin includes flowing the second resin horizontally over a bottom of the fiber preform.

According to still another disclosed embodiment, a method is provided of infusing a fiber preform with at least two differing resins. First and second resin flow media are overlapped along an edge of the fiber preform. A barrier is placed between the overlapping first and second resin flow media to isolate the first resin from the second resin. First and second differing resins are flowed through the fiber preform respectively through the first and second resin flow media. Flowing the first and second differing resins includes flowing the first resin horizontally over a top of the fiber preform, and flowing the second resin horizontally over a bottom of the fiber preform. The method may further comprise placing first and second resin delivery tubes side-by-side along the edge of the fiber preform and coupling the first and second resin delivery tubes respectively with the first and second flow media.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 5 is an illustration of the area designated as "FIG. 5" in FIG. 4.

FIG. 6 is an illustration of the area designated as "FIG. 6" in FIG. 5, but exploded to better show the individual layers.

FIG. 10 is an illustration of a flow diagram of aircraft production and service methodology.

FIG. 11 is an illustration of a block diagram of an aircraft.

DETAILED DESCRIPTION

Figure 1:
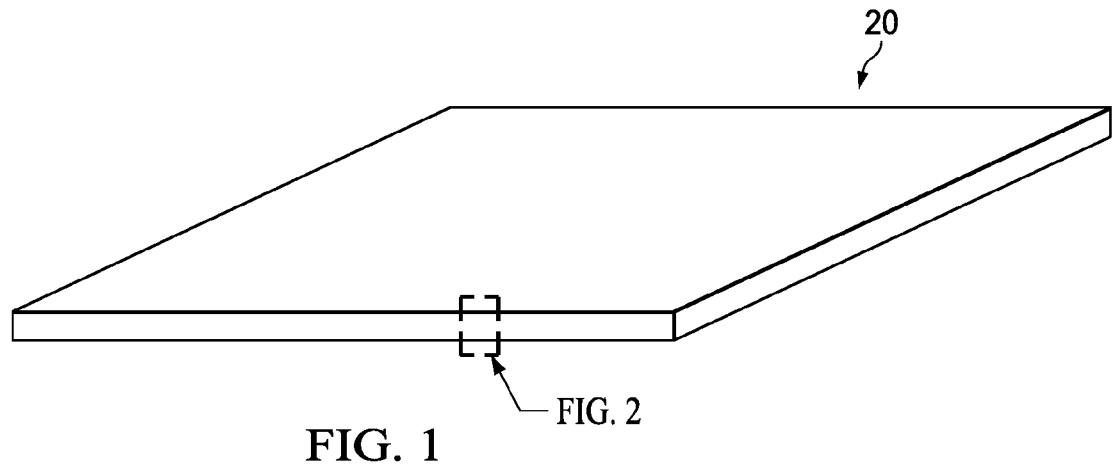
FIG. 1 is an illustration of a resin infused part containing at least two differing resins.
Figure 2:
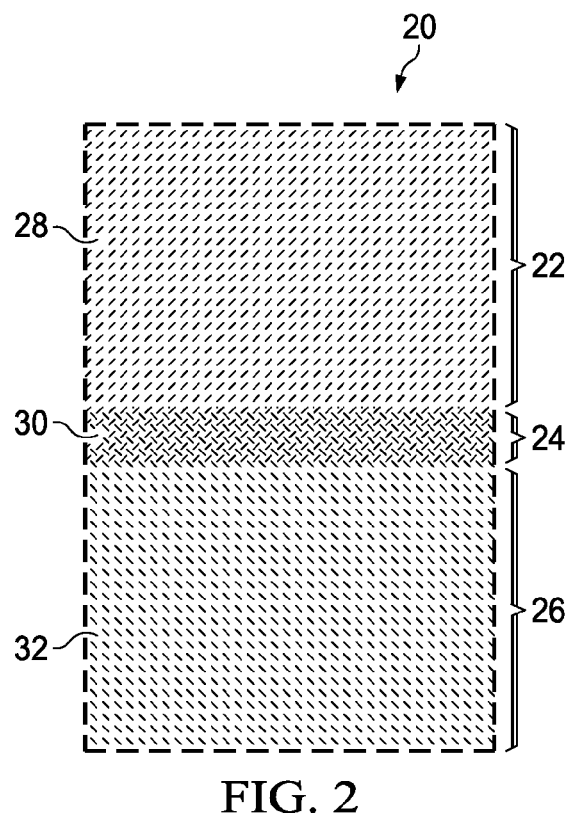
FIG. 2 is an illustration of the area designated as "FIG. 2" in FIG. 1, showing the blending of the two resins.

Referring first to FIGS. 1 and 2, a composite part 20 is fabricated by a resin infusion process, discussed in more detail below, using at least two differing polymer resins 28, 32. Resins 28, 32 may be any of a variety of polymer resins suitable for the application including but not limited to thermosets and thermoplastics. The part 20 has an upper or top region 22 formed of the first resin 28, and a lower or bottom region 26 formed of the second resin 32 which is different from the first resin 28. A third, intermediate region 24 between the top and bottom regions 22, 26, comprises a substantially even blend 30 of resins 28, 32 that forms a seamless interface between the two regions 22, 26.

Either the top or bottom regions 22, 26 may comprise a surface treatment of the part 20. In other embodiments, the part 20 may have more than two regions 22, 26 each formed by a differing resin. Although not shown in FIGS. 1 and 2, the fiber preform that is infused with the two resins 28, 32 may comprise any continuous reinforcement material that is suitable for the application, including polymers, metals and ceramics or a combination thereof, arranged in any of a variety of configurations, including but not limited to one or more layers of woven, knitted, braided or random fabric.

FIGS. 3-6 illustrate a resin infusion apparatus for infusing a fiber preform 40 with differing resins 28, 32 using any one of several known vacuum infusion processes. The preform 40 is supported on a resin infusion tool 34 and is infused using first and second resin delivery assemblies 36, 38 which respectively deliver two differing resins 28, 32 (FIG. 2) at two different locations on the preform 40 concurrently. In the illustrated embodiment, resin is delivered horizontally to the top side and bottom side of the preform 40, however other resin delivery locations are possible. A vacuum bag (FIG. 4) covers the preform 40 as well as the resin delivery assemblies 36, 38 and is sealed around its periphery to the infusion tool 34 using any suitable material, such as sealant tape.

Figure 3:
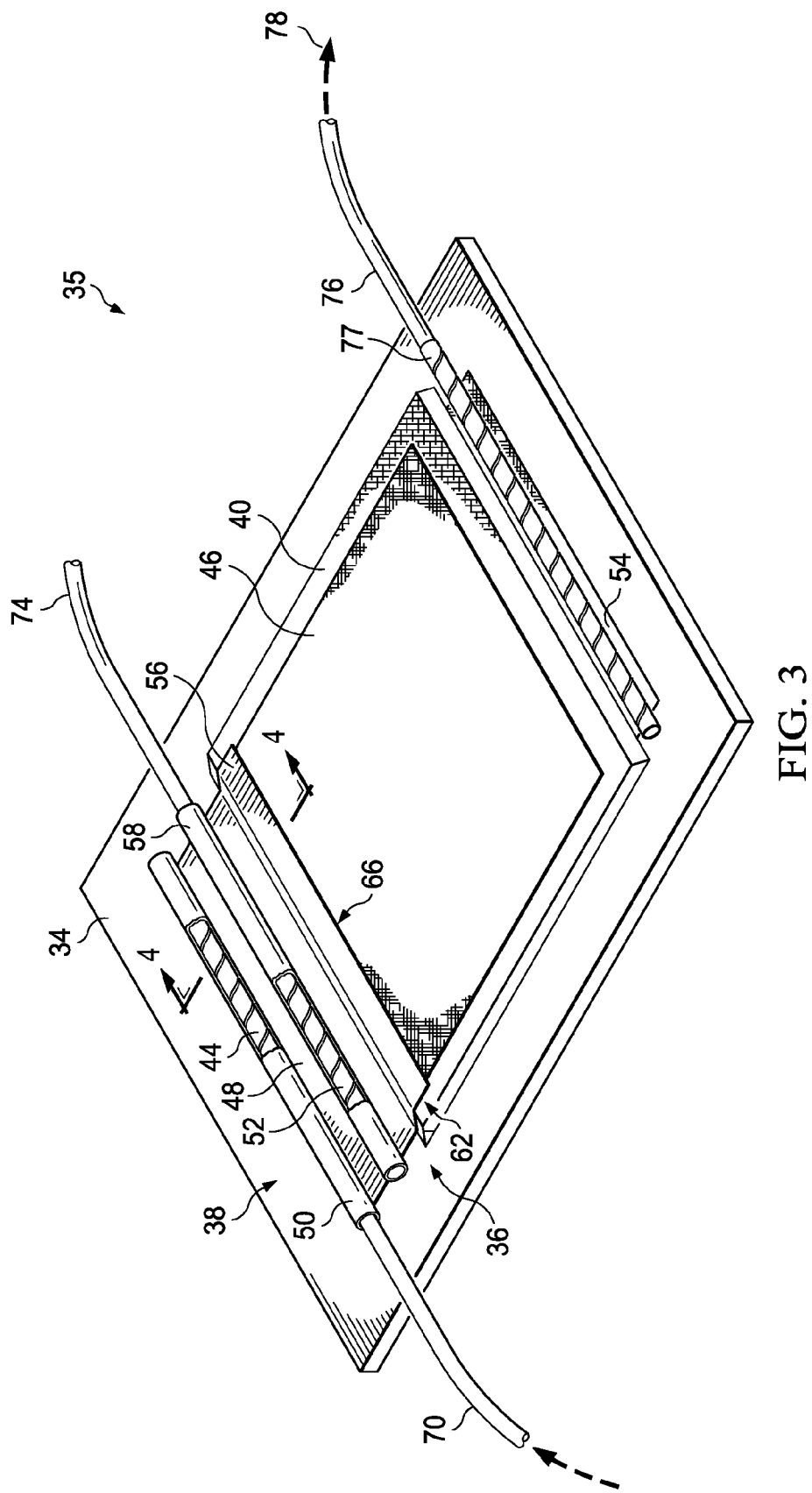
FIG. 3 is an illustration of a perspective view of an apparatus for resin infusion of the part shown in FIGS. 1 and 2, a vacuum bag not shown for clarity and parts of outer tubes being broken away to reveal spiral tubes.
Figure 4:
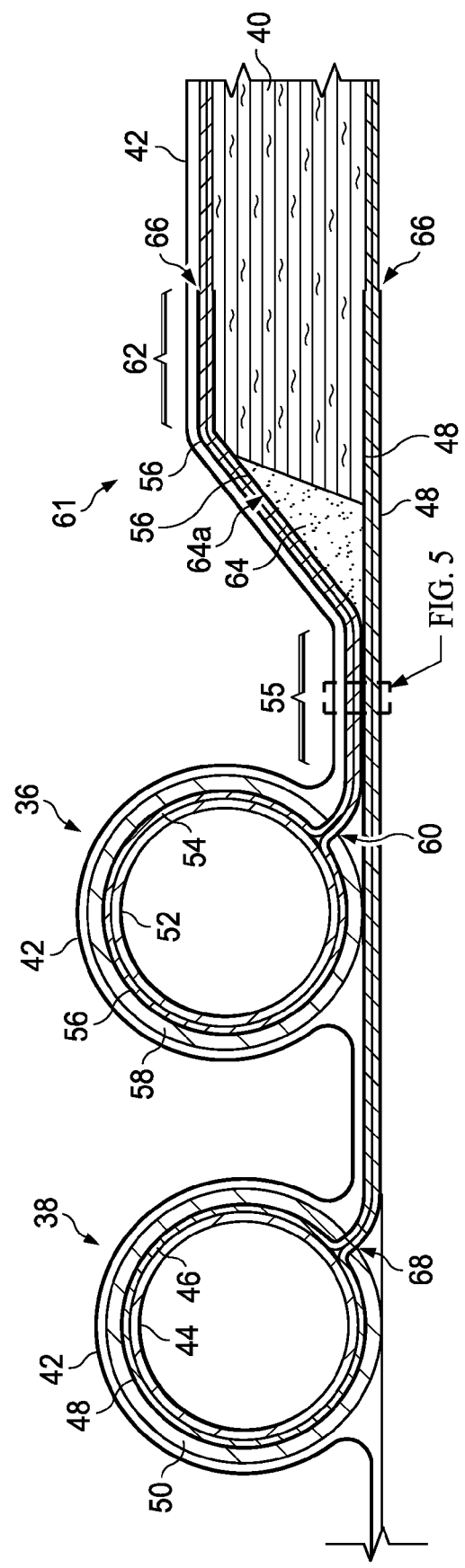
FIG. 4 is an illustration of a cross-sectional view taken along the line 4-4 in FIG. 3.

Although not shown in FIGS. 3 and 4 for sake of simplicity, one or more breather layers, peel plies, caul plates or other materials/layers may overlie the preform 40 depending on the application, and the particular part being fabricated. Excess resin is drawn away 78 from the preform 40 under a vacuum through a resin outlet tube 76 which is coupled with a spiral outlet tube 77. The spiral outlet tube 77 overlies the flow media 54, collects excess resin over the width of the flow media 54. Depending upon the particular resin infusion process being employed, a second vacuum bag (not shown) covering vacuum bag 42 and sealed to the infusion tool 34 may be used to perform the infusion process using a controlled atmospheric pressure resin infusion (CAPRI), which is known in the art.

The resin delivery assemblies 36, 38 are stacked along one edge 60 of the preform 40. As best seen in FIG. 4, the resin delivery assembly 36 partially overlaps resin delivery assembly 38 and delivers resin to the top side of the preform 40, and resin delivery assembly 38 delivers resin to the bottom side of the preform 40. The resin delivery assembly 38 broadly comprises a spiral resin delivery tube 44, resin flow media 46 and an outer tube 50 having a longitudinal slit 68 therein. The resin flow media 46 is wrapped around the spiral tube 44 and is surrounded by the outer tube 50. The flow media 46 is sandwiched between nonporous barrier films 48. The flow media 46 extends radially outward through the slit 68 and laterally across the surface of the infusion tool, beneath the preform 40.

The resin delivery assembly 36 broadly comprises a spiral resin delivery tube 52, resin flow media 54 and an outer tube 58 having a longitudinal slit 60 therein. The resin flow media 54 is wrapped around the spiral resin delivery tube 52 and is surrounded by the outer tube 58. The resin flow media 54 is sandwiched between the nonporous barrier films 56. The flow media 54 extends radially outward through the slit 60 in the outer tube 58, and laterally across the top of the preform 40.

As best seen in FIG. 4, the two spiral tubes 44, 52 are arranged generally parallel to each other, side-by-side along one edge 61 of the preform 40. The flow media 46, 54 overlap each other along a stretch 55 between the spiral tube 52 and the preform 40. The barrier films 48, 56 isolate the two flow media 46, 54 from each other along the overlapping stretch 55. A nonporous separation barrier 64, formed of any suitable nonporous material such as a film or a foam, is positioned along the edge 61 of the preform 40 and forms a transition that separates the two flow media 46, 54. The nonporous separation barrier 64 includes a ramp surface 64a which ramps the flow media 54 upwardly to the top side of the preform 40. The nonporous barrier films 48, overlap 62 the edge 61 of the preform 40 a short distance in order to assure that resin flow is directed horizontally into the top and bottom of the preform 40. Once the resin flows past the outer edges 66 of the flow media 46, 54, resin flows directly into the top and bottom of the preform 40, while also backflowing and filling the area of the preform 40 within the overlap 62.

Figure 7:
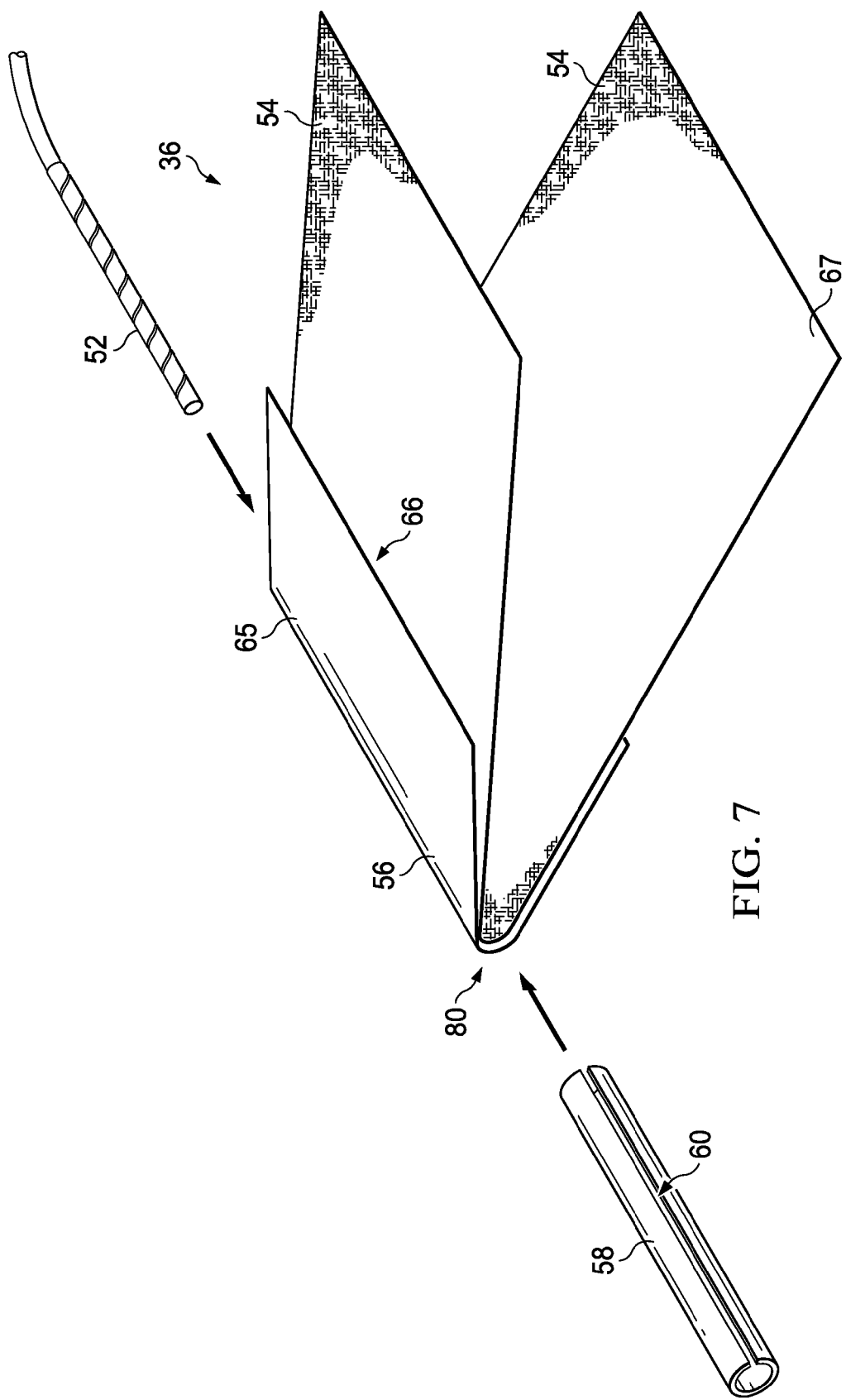
FIG. 7 is an illustration of a perspective view showing the components of one of the resin delivery assemblies forming part of the apparatus of FIG. 3.

Attention is now directed to FIG. 7 which illustrates additional details of the resin delivery assembly 36 as well as a method of assembling the resin delivery assembly 36. A sheet 65 of the nonporous barrier film 56 is placed over a sheet 67 of the flow media 54, and the combination of the two sheets 65, 67 are folded 80 over the spiral tube 52 and onto themselves. The folded sheets 65, 67 are then slid end-wise through the longitudinal slit 60 in the outer tube 58, and the assembly of the two sheets 65, 67 along with the spiral tube 52 is slid into the interior of the outer tube 58. The details of the resin delivery assembly 38 and method for its assembly, are substantially identical to those of the resin delivery assembly 36 described above and shown in FIG. 7.

Referring again to FIGS. 3 and 4, in use, the resin delivery assembly 38 is placed on the tool 34 following which, a suitable fiber preform 40 is placed on the flow media 46 that overlies the tool 34. Then, the nonporous separation barrier 64 (FIG. 4) is placed along the edge 61 of the preform 40. Next, the resin delivery assembly 36 is installed. Peel plies and/or breathers (not shown) may also be installed, as required. Finally, the vacuum bag 42 is installed and sealed around its periphery to the infusion tool 34. A vacuum is drawn in outlet tube (FIG. 3) in order to draw resin into the resin delivery assemblies 36, 38, respectively through resin inlet tubes 74, 70. Resin drawn into the inlet tubes 74, 70 concurrently flows into the spiral tubes 44, 52 which feeds the flow media 46, 54 along the length of the spiral tubes 44, 52. The differing resins 28, 32 respectively distributed by the spiral tubes 52, 44 are vacuum drawn respectively through the flow media 54, 46 to the bottom and top of the preform 40. As the two differing resins 28, 32 flow concurrently into the top and bottom of the preform 40, the resins 28, 32 blend together in the intermediate region 24, resulting in a resin infused preform 40 that is substantially monolithic and integrated as previously mentioned.

Figure 8:
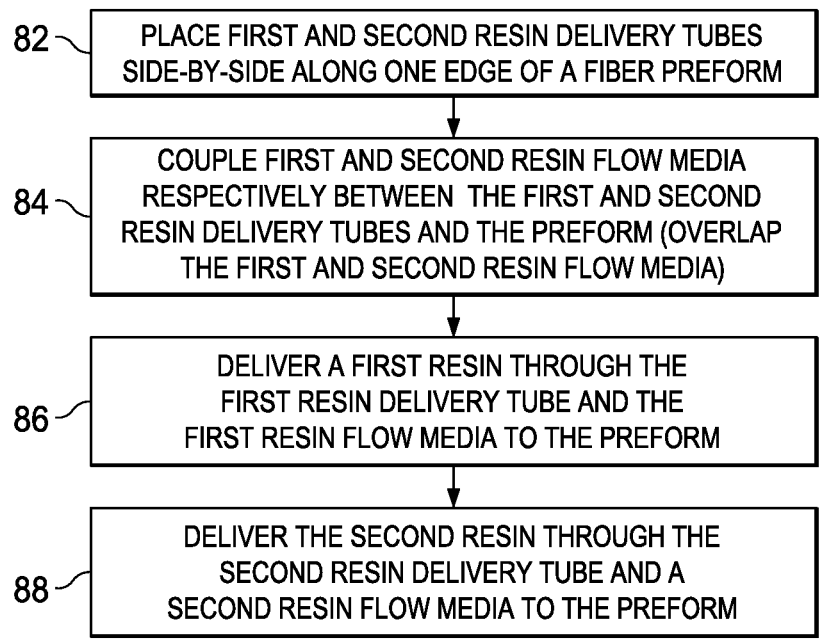
FIG. 8 is an illustration of a flow diagram of a method of resin infusion using two differing resins.

Attention is now directed to FIG. 8 which broadly illustrates the overall steps of a method of infusing a fiber preform with at least two differing resins in a single infusion according to the embodiments described previously. At step 82, first and second resin delivery tubes are placed side-by-side along one edge of a fiber preform 40. At 84, first and second resin flow media are coupled to first and second resin delivery tubes and to the preform. The first and second resin flow media are overlapped. At step 86, a first resin is delivered through the first resin delivery tube and the first resin flow media to the top of the preform 40. At step 88, a second resin is delivered through the second resin delivery tube and a second resin flow media to the bottom of the preform 40.

Figure 9:
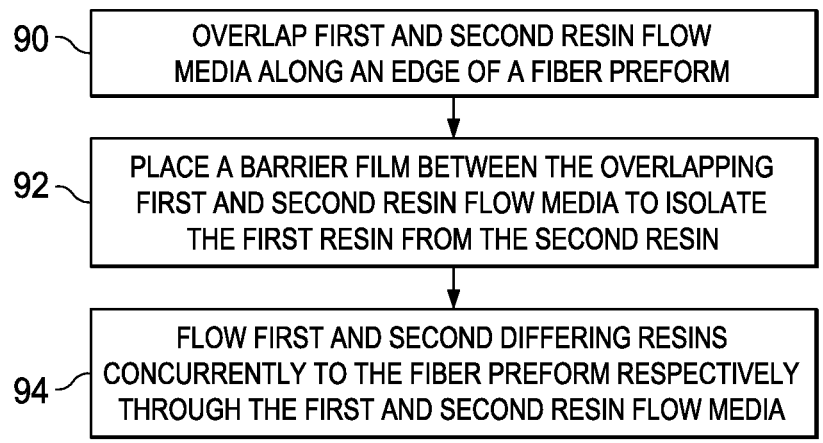
FIG. 9 is an illustration of a flow diagram of an alternate method of resin infusion using two differing resins.

FIG. 9 broadly illustrates the overall steps of an alternate method according to the embodiments previously described. At step 90, first and second resin flow media are overlapped along an edge 61 of a fiber preform. At step 92, a nonporous barrier film is placed between the overlapping first and second resin flow media in order to isolate a first resin from a second resin. At step 94, the first and second differing resins are flowed concurrently to the fiber preform respectively through the first and second resin flow media.

Embodiments of the disclosure may find use in a variety of potential applications, particularly in the transportation industry, including for example, aerospace, marine, automotive applications and other application where composite parts are used that require two differing resin systems in a single part. Thus, referring now to FIGS. 10 and 11, embodiments of the disclosure may be used in the context of an aircraft manufacturing and service method 96 as shown in FIG. 10 and an aircraft 98 as shown in FIG. 11. Aircraft applications of the disclosed embodiments may include, for example, without limitation, skins and panels that require differing surface treatments. During pre-production, exemplary method 96 may include specification and design 100 of the aircraft 98 and material procurement 102. During production, component and subassembly manufacturing 104 and system integration 106 of the aircraft 98 takes place. Thereafter, the aircraft 98 may go through certification and delivery 108 in order to be placed in service 110. While in service by a customer, the aircraft 98 is scheduled for routine maintenance and service 112, which may also include modification, reconfiguration, refurbishment, and so on.

Each of the processes of method 96 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 11, the aircraft 98 produced by exemplary method 96 may include an airframe 114 with a plurality of systems 116 and an interior 118. Examples of high-level systems 116 include one or more of a propulsion system 120, an electrical system 122, a hydraulic system 124 and an environmental system 126. Any number of other systems may be included. Although an aerospace example is shown, the principles of the disclosure may be applied to other industries, such as the marine and automotive industries.

Systems and methods embodied herein may be employed during any one or more of the stages of the production and service method 96. For example, components or subassemblies corresponding to production process 104 may be fabricated or manufactured in a manner similar to components or subassemblies produced while the aircraft 98 is in service. Also, one or more apparatus embodiments, method embodiments, or a combination thereof may be utilized during the production stages 104 and 106, for example, by substantially expediting assembly of or reducing the cost of an aircraft 98. Similarly, one or more of apparatus embodiments, method embodiments, or a combination thereof may be utilized while the aircraft 98 is in service, for example and without limitation, to maintenance and service 112.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art of resin infusion. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An Apparatus for infusing a fiber preform with at least two differing resins, comprising:
    a first resin delivery assembly capable of delivering a first resin to a first location on the fiber preform, including a first flow media;
    a second resin delivery assembly capable of delivering a second resin to a second location on the fiber preform, including a second flow media overlapping the first flow media; and, wherein at least one of the first and second resin delivery assemblies includes a nonporous barrier film between the first and second flow media.

2. The apparatus of claim 1, wherein each of the first and second flow media is sandwiched between nonporous barrier films.

3. The apparatus of claim 2, wherein the nonporous barrier films overlap an edge of the fiber preform.

4. The apparatus of claim 1, further comprising:
    a nonporous barrier separating the first flow media from the second flow media along an edge of the fiber preform.

5. The apparatus of claim 4, wherein:
    the fiber preform has a top side, a bottom side and an edge between the top side and the bottom side,
    the first flow media is located on the top side of the fiber preform,
    the second flow media is located on the bottom side of the fiber preform, and
    the nonporous barrier includes a ramp surface supporting the first flow media along the edge of the fiber preform.

6. The apparatus of claim 1, wherein:
    the first resin delivery assembly includes a first resin delivery tube extending along an edge of the fiber preform and coupled with the first flow media,
    the second resin delivery assembly includes a second resin delivery tube extending along the edge of the fiber preform and coupled with the second flow media.

7. The apparatus of claim 6, wherein:
    the first and second resin delivery tubes are arranged side-by-side, and
    the first and second flow media respectively infuse the fiber preform with the first and second resins through a thickness of the fiber preform.

8. The apparatus of claim 6, wherein:
    the first flow media is wrapped around the first resin delivery tube,
    the second flow media is wrapped around the second resin delivery tube, and
    the second resin delivery tube overlies the second flow media.

9. The apparatus of claim 8, wherein:
    the first resin delivery assembly includes an outer first tube surrounding the first resin delivery tube, the outer first tube having a longitudinal first slit therein and wherein the first flow media passes through the longitudinal first slit,
    the second resin delivery assembly includes an outer second tube surrounding the second resin delivery tube, the outer second tube having a longitudinal second slit therein and wherein the second flow media passes through the longitudinal second slit.

10. An Apparatus for concurrently infusing a fiber preform with first and second differing resins, comprising:
    a first resin delivery tube located along an edge of the preform and capable of delivering a first resin to the fiber preform;
    a second resin delivery tube located along the edge of the preform and capable of delivering a second resin to the fiber preform, wherein the second resin is different from the first resin;
    first and second overlapping flow media respectively coupled between the first and second resin delivery tubes and the fiber preform; and, placing at least one nonporous barrier film between the first and second overlapping flow media.

11. The apparatus of claim 10, wherein the first and second resin delivery tubes are disposed side-by-side and are laterally spaced from the edge of the preform.

12. The apparatus of claim 10, further comprising:
    first nonporous barrier films between which a first flow media is sandwiched, and
    second nonporous barrier films between which a second flow media is sandwiched.

13. The apparatus of claim 12, further comprising:
    a first outer tube surrounding the first resin delivery tube and having a longitudinal first slit therein, wherein the first flow media is located between the first delivery tube and the first outer tube, and the first flow media extends through the longitudinal first slit in the first outer tube, and
    a second outer tube surrounding the second resin delivery tube and having a longitudinal second slit therein, wherein the second flow media is located between the second resin delivery tube and the second outer tube and the second flow media extends through the longitudinal second slit in the second outer tube.

14. The apparatus of claim 12, wherein each of the first and second resin delivery tubes includes a spiral opening allowing resin to flow therethrough.

15. A method of infusing a fiber preform with at least two differing resins, comprising:
    placing first and second resin delivery tubes side-by-side along one edge of a fiber preform;
    coupling first and second resin flow media respectively between the first and second resin delivery tubes and the preform, including overlapping the first and second resin flow media; placing a barrier film between an area of overlap between the first and second resin flow media
    delivering a first resin through a first resin delivery tube and a first resin flow media to the preform; and
    delivering a second resin through a second resin delivery tube and the second resin flow media to the preform.

16. The method of claim 15, wherein:
    delivering the first resin includes flowing the first resin horizontally over a top of the fiber preform, and
    delivering the second resin includes flowing the second resin horizontally over a bottom of the fiber preform.

17. A method of infusing a fiber preform with at least two differing resins, comprising:
    overlapping first and second resin flow media along an edge of the fiber preform;
    placing a barrier film between the overlapping first and second resin flow media to isolate the first resin from the second resin; and
    flowing first and second differing resins to the fiber preform respectively through the first and second resin flow media.

18. The method of claim 17, wherein flowing the first and second differing resins includes:
    flowing the first resin horizontally over a top of the fiber preform, and
    flowing the second resin horizontally over a bottom of the fiber preform.

19. The method of claim 17, further comprising:
    placing first and second resin delivery tubes side-by-side along the edge of the fiber preform; and
    coupling the first and second resin delivery tubes respectively with the first and second resin flow media.

* * * * *

UNITED STATES PATENT AND TRADEMARK OFFICE
CERTIFICATE OF CORRECTION

PATENT NO. : 9,738,011 B2  
APPLICATION NO. : 14/282199  
DATED : August 22, 2017  
INVENTOR(S) : Dennis James Hanks and Hugh A. Yap Page 1 of 1

It is certified that error appears in the above-identified patent and that said Letters Patent is hereby corrected as shown below:

In the Claims

Column 9, Line 9, change "a" to --the--.  
Column 9, Line 15, after "media" insert --;--.

Signed and Sealed this  
Twelfth Day of December, 2017

Joseph Matal  
*Performing the Functions and Duties of the*  
*Under Secretary of Commerce for Intellectual Property and*  
*Director of the United States Patent and Trademark Office*